(12) United States Patent
Liang

(10) Patent No.: US 9,126,076 B2
(45) Date of Patent: Sep. 8, 2015

(54) ELECTRICITY-GENERATION GYMNASIUM BICYCLE

(75) Inventor: Xiwu Liang, Shenzhen (CN)

(73) Assignee: SHENZHEN ANTUOSHAN SPECIAL MACHINE & ELECTRICAL CO., LTD, Shenzhen, Guangdong (CN)

(*) Notice: Subject to any disclaimer, the term of this patent is extended or adjusted under 35 U.S.C. 154(b) by 215 days.

(21) Appl. No.: 13/882,169

(22) PCT Filed: Nov. 2, 2010

(86) PCT No.: PCT/CN2010/078331
§ 371 (c)(1),
(2), (4) Date: Jul. 5, 2013

(87) PCT Pub. No.: WO2012/058799
PCT Pub. Date: May 10, 2012

(65) Prior Publication Data
US 2013/0274064 A1    Oct. 17, 2013

(51) Int. Cl.
| | |
|---|---|
| *A63B 24/00* | (2006.01) |
| *A63B 22/06* | (2006.01) |
| *A63B 21/005* | (2006.01) |
| *H02K 7/18* | (2006.01) |
| *F03G 5/06* | (2006.01) |

(52) U.S. Cl.
CPC .............. *A63B 22/06* (2013.01); *A63B 21/0053* (2013.01); *A63B 22/0605* (2013.01); *F03G 5/06* (2013.01); *H02K 7/1861* (2013.01); *A63B 2021/0054* (2013.01)

(58) Field of Classification Search
CPC .............. A63B 22/06; A63B 22/0605; A63B 21/0053; A63B 2021/0054
USPC .......................................... 482/1–9, 900–902
See application file for complete search history.

(56) References Cited

U.S. PATENT DOCUMENTS

| | | | | |
|---|---|---|---|---|
| 4,261,562 | A * | 4/1981 | Flavell | 482/6 |
| 4,298,893 | A * | 11/1981 | Holmes | 348/730 |
| 6,717,280 | B1 * | 4/2004 | Bienville | 290/1 R |
| 6,987,327 | B1 * | 1/2006 | Lucatero | 290/1 A |
| 7,628,737 | B2 * | 12/2009 | Kowallis et al. | 482/94 |
| 2002/0147079 | A1 * | 10/2002 | Kalnbach | 482/57 |
| 2006/0035768 | A1 * | 2/2006 | Kowallis et al. | 482/123 |
| 2011/0316289 | A1 * | 12/2011 | Trimarche | 290/1 D |
| 2012/0238406 | A1 * | 9/2012 | Beard et al. | 482/2 |

* cited by examiner

*Primary Examiner* — Glenn Richman

(57) ABSTRACT

A fitness power generation bicycle includes: a bicycle gymnastic device, comprising a main frame and a drive sprocket pin-jointed with the main frame; a generator located on the main frame, comprising a shaft and a driven sprocket fixed on the shaft; a chain connecting the drive sprocket with the driven sprocket; a battery electrically connected with the generator for storing an electric energy from the generator; and an inverter electrically connected with the battery for adjusting an output current of the battery. The above-mentioned fitness power generation bicycle combines the fitness with power generation, which not only makes the user take exercise, but also stores the energy from the exercise, thereby achieving the environmental protection.

14 Claims, 6 Drawing Sheets

ELECTRICITY-GENERATION GYMNASIUM BICYCLE

BACKGROUND OF THE PRESENT INVENTION

1. Field of Invention

The present invention relates to a fitness equipment, and more particularly to an exercise bicycle with power generation function.

2. Description of Related Arts

With the increasing quality of life, people's fitness consciousness is also improved, more and more people join the fitness. Traditional fitness equipments are only used for people to take exercise. The user consumes a large amount of physical strength in taking exercise by the fitness equipments. However, a lot of energy generated by physical strength are lost in vain, which has to say is a waste of resources for more and more nervous energy in today's society.

SUMMARY OF THE PRESENT INVENTION

Based on the above-mentioned description, it is necessary to provide a fitness power generation bicycle, which combines the fitness with the power generation for energy conservation.

A fitness power generation bicycle, comprises: a bicycle gymnastic device, comprising a main frame and a drive sprocket pin-jointed with the main frame; a generator located on the main frame, comprising a shaft and a driven sprocket fixed on the shaft; a chain connecting the drive sprocket with the driven sprocket; a battery electrically connected with the generator for storing the electric energy produced by the generator; and an inverter electrically connected with the battery for adjusting the output current of the battery.

In the preferred embodiment, the main frame comprises a base, a bicycle beam fixedly set on the base, and the support plates fixedly located between the base and the bicycle beam, and the generator is movably located on the support plates.

In the preferred embodiment, the fixing plates fixedly located on the generator are further included, a first positioning groove is provided on one of the fixing plate and the support plate, and a first locking member, which is capable of sliding within the first positioning groove for adjusting the distance between the driven sprocket and the drive sprocket, is provided on the other of the fixing plate and the support plate.

In the preferred embodiment, the first positioning groove is provided at the edge of the fixing plate and extends towards the direction away from the drive sprocket.

In the preferred embodiment, a flywheel is further included, located on the generator and fixed with the shaft.

In the preferred embodiment, the main frame comprises a base and a motor stand located on the base, and the generator is movably located on the motor stand.

In the preferred embodiment, a motor base fixed with the generator is further included, a second positioning groove is provided on one of the motor base and the motor stand, and a second locking member, which is capable of sliding within the second positioning groove for adjusting the distance between the generator and the drive sprocket, is provided on the other of the motor base and the motor stand.

In the preferred embodiment, the generator is the rare earth permanent magnet coreless generator.

The above-mentioned fitness power generation bicycle combines the fitness with the power generation, which not only makes the user take exercise, but also stores the energy generated by the exercise for later use if necessary, and plays the role of energy conservation and environmental protection to certain extent.

DETAILED DESCRIPTION OF THE PREFERRED EMBODIMENT

The fitness power generation bicycle is further explained in detail with the accompanying drawings and a plurality of embodiments. It should be understood that, under the condition of no exception explanations, the characteristics of a plurality of following embodiments can also be usefully combined with each other.

Figure 1:
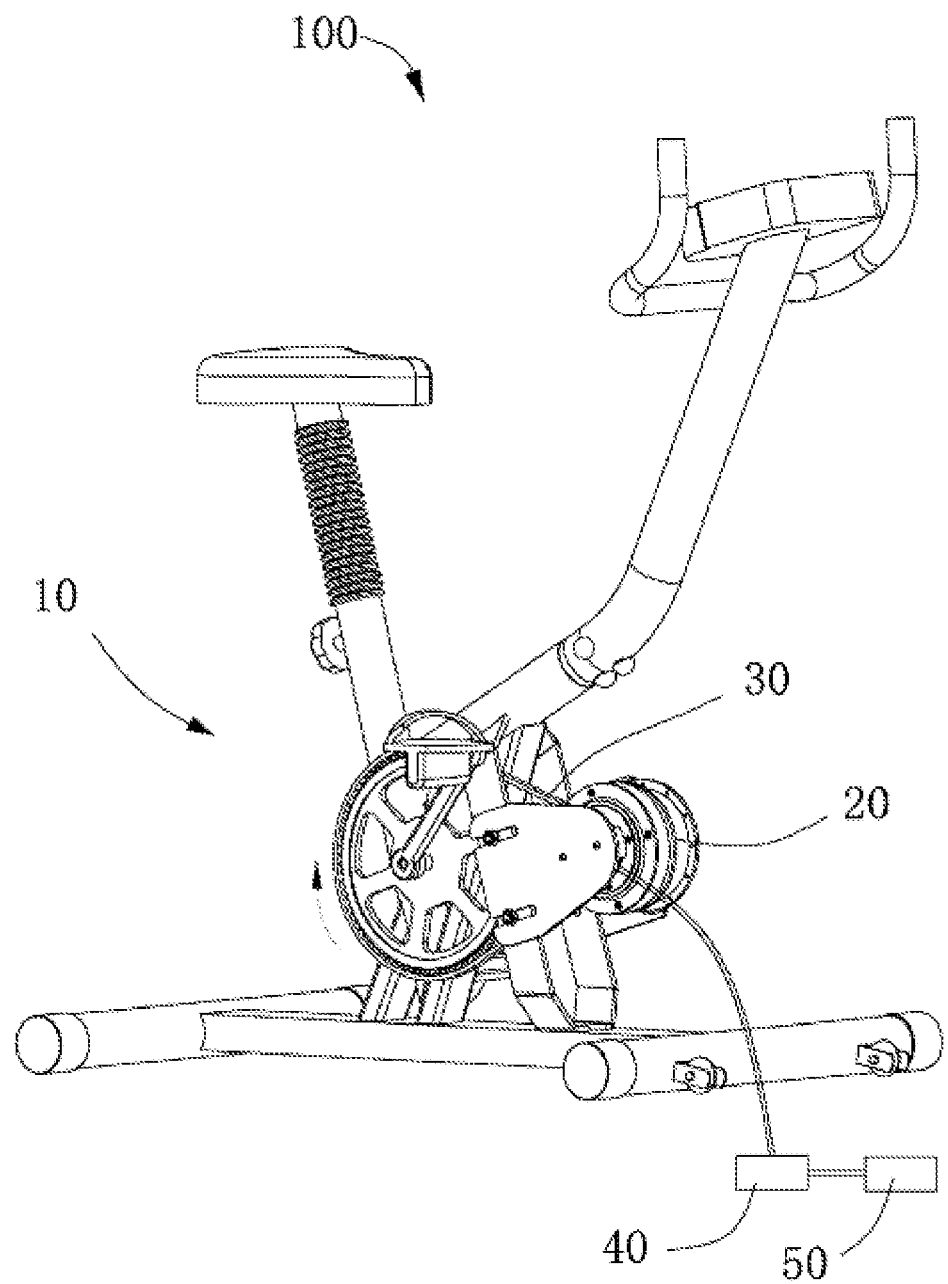
FIG. 1 is a three-dimensionally assembling schematic diagram of a fitness power generation bicycle according to the first embodiment.

Referring to FIG. 1, a fitness power generation bicycle of the first embodiment comprises a bicycle gymnastic device 10, a generator 20, a chain 30, a battery 40 and an inverter 50.

Figure 2:
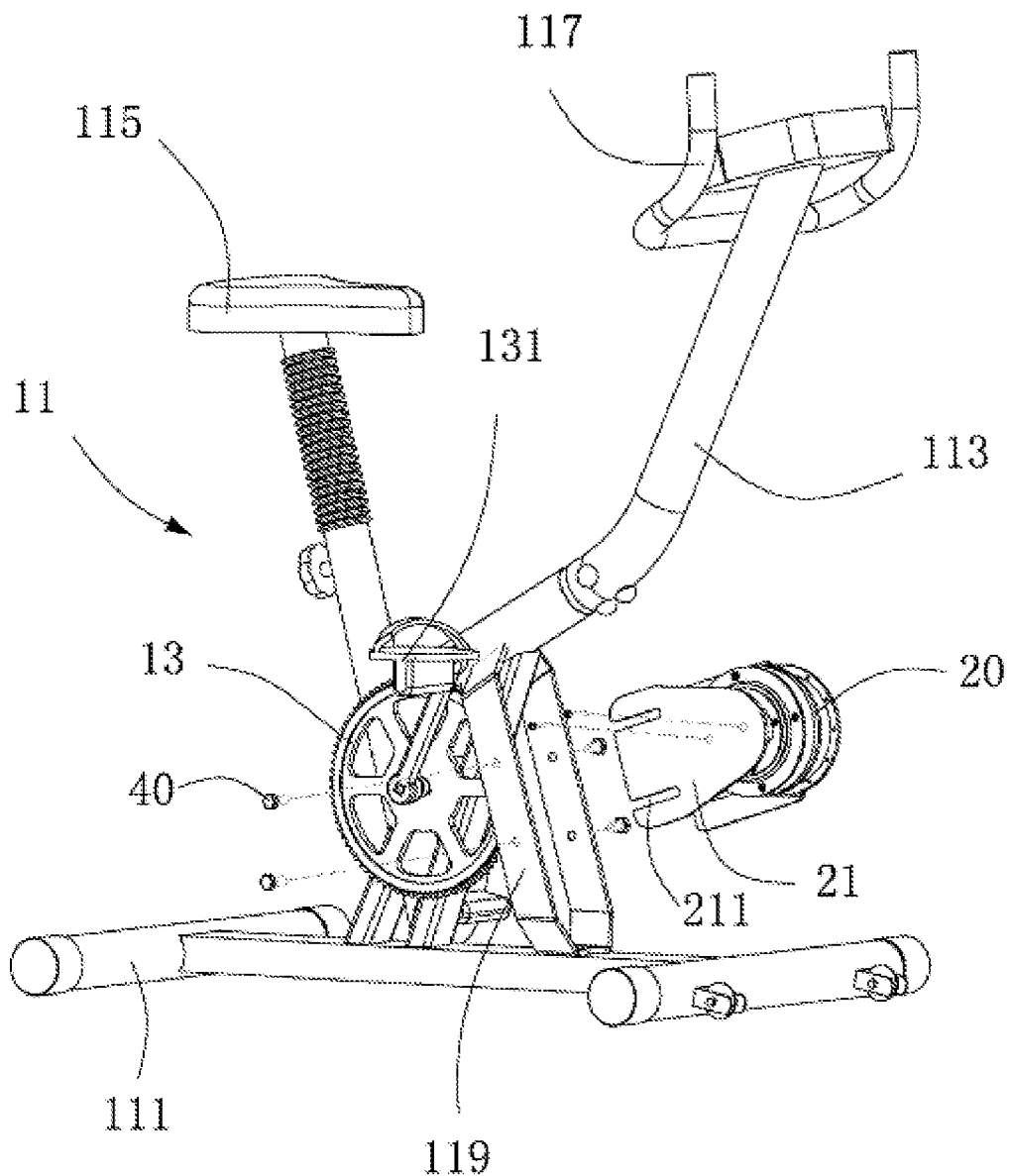
FIG. 2 is a three-dimensionally partially exploded schematic diagram of the fitness power generation bicycle shown in FIG. 1.

Please also referring to FIG. 2, the bicycle gymnastic device 10 comprises a main frame 11 and a drive sprocket 13. The main frame 11 comprises a base 111 and a bicycle beam 113 and a bicycle seat 115 fixedly set on the base 111. The bicycle beam 113 is approximately L-shaped. The front end of the bicycle beam forms a handle 117 for the user to grip. The drive sprocket 13 is pin-jointed at the bottom of the bicycle beam 113. Two pedals 131 are also located on the drive sprocket 13. The user can sit on the bicycle seat 115 to pedal the pedals 131 for driving the drive sprocket 13 to rotate.

Figure 3:
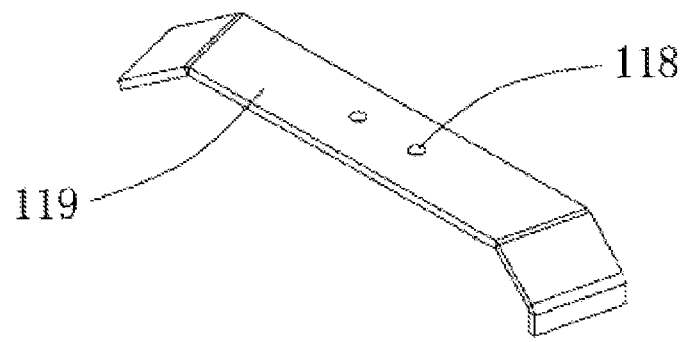
FIG. 3 is three-dimensionally schematic diagram of a support plate shown in FIG. 1.

The main frame 11 further comprises two support plates 119 located between the base 111 and the bicycle beam 113. Every support plate 119 is approximately U-shaped. Two ends of every support plate respectively fixed on the base 111 and the bicycle beam 113 by welding. Please also referring to FIG. 3, two fixing holes 118 are provided in the middle of every support plate 119. The support plates 119 can improve the stationarity of the main frame 11 for avoiding the shake of the main frame 11 while the user doing fitness exercise. The generator 20 is movably set on the two support plates 119.

Figure 4:
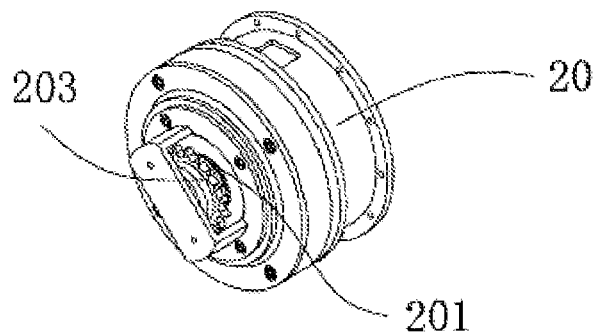
FIG. 4 is three-dimensionally schematic diagram of a generator shown in FIG. 1.

Please also referring to FIG. 4, the generator 20 comprises a shaft 201 and a driven sprocket fixed on the shaft 201. The generator 20 is preferably the rare earth permanent magnet coreless generator.

Figure 5:
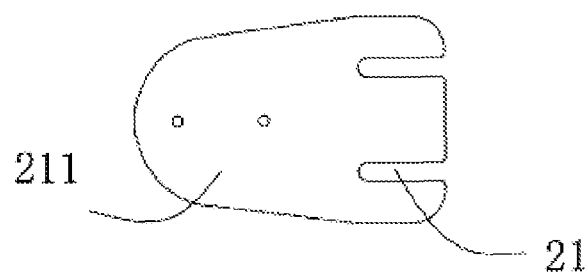
FIG. 5 is three-dimensionally schematic diagram of a fixing plate shown in FIG. 1.

The fitness power generation bicycle 100 further comprises two fixing plates 21. The two fixing plates 21 are respectively fixed at two sides of the generator 20 by a plurality of bolts (which are not shown). Please also referring to FIG. 5, preferably, two first positioning grooves 211, substantially parallel to each other, are provided on every fixing plate 21. Every first positioning groove 211 is provided at the edge of the fixing plate 21, and extends towards the direction away from the drive sprocket 13.

Preferably, the fitness power generation bicycle 100 further comprises four first locking members 40. Every first locking member 40 passes through one fixing hole 118 of the support plate 119 and is locked within the first positioning groove 211 of the fixing plate 21.

While assembling, two support plates 119 are firstly welded between the base 111 and the bicycle beam 113, and then two fixing plates 21 are respectively fixed at two sides of the generator 20 by a plurality of bolts, and then two fixing plates 21 together with the generator 20 are respectively locked on two support plates 119 by four first locking members 40, and finally the drive sprocket 13 of the bicycle gymnastic device 10 is connected with the driven sprocket 203 of the generator 20 by the chain 30, and the generator 20, the battery 40 and the inverter 50 are electrically connected with each other by wire. The fitness power generation bicycle 100 is completely assembled.

While using, the user pedals the pedals 131 for driving the drive sprocket 13 to rotate, and driving the driven sprocket 203 of the generator 20 by the chain 30 to rotate, thus the generator 20 generates electric energy. The generator 20 can produce the current with different voltages according to the rotating speed of the driven sprocket 203. The current charges the battery 40. The electric energy stored by the battery 40 becomes the standard 220V, 50 Hz AC (alternating current) after being adjusted by the inverter 50 for indoor lighting or household appliances.

The fitness strength can be adjusted by the user according to individually physical strength. In this embodiment, by adjusting the sliding position of the first locking member 40 in the first positioning groove 211, the distance between the driven sprocket 203 of the generator 20 and the drive sprocket 13 of the bicycle gymnastic device 10 is adjusted, thereby adjusting the degree of tightness of the chain 30.

The above-mentioned fitness power generation bicycle 100 has simple structure and convenient operation, and safe and environmentally-friendly power generation process, which not only makes the user take exercise, but also stores the energy generated by the exercise for later use if necessary, and plays the role of energy conservation and environmental protection to certain extent.

It can be understood that, the first positioning grooves 211 can also be provided on the support plates 119, now, the first locking members 40 are correspondingly provided on the fixing plates 21. The amount of the first locking members 40 is not limited to four.

Figure 6:
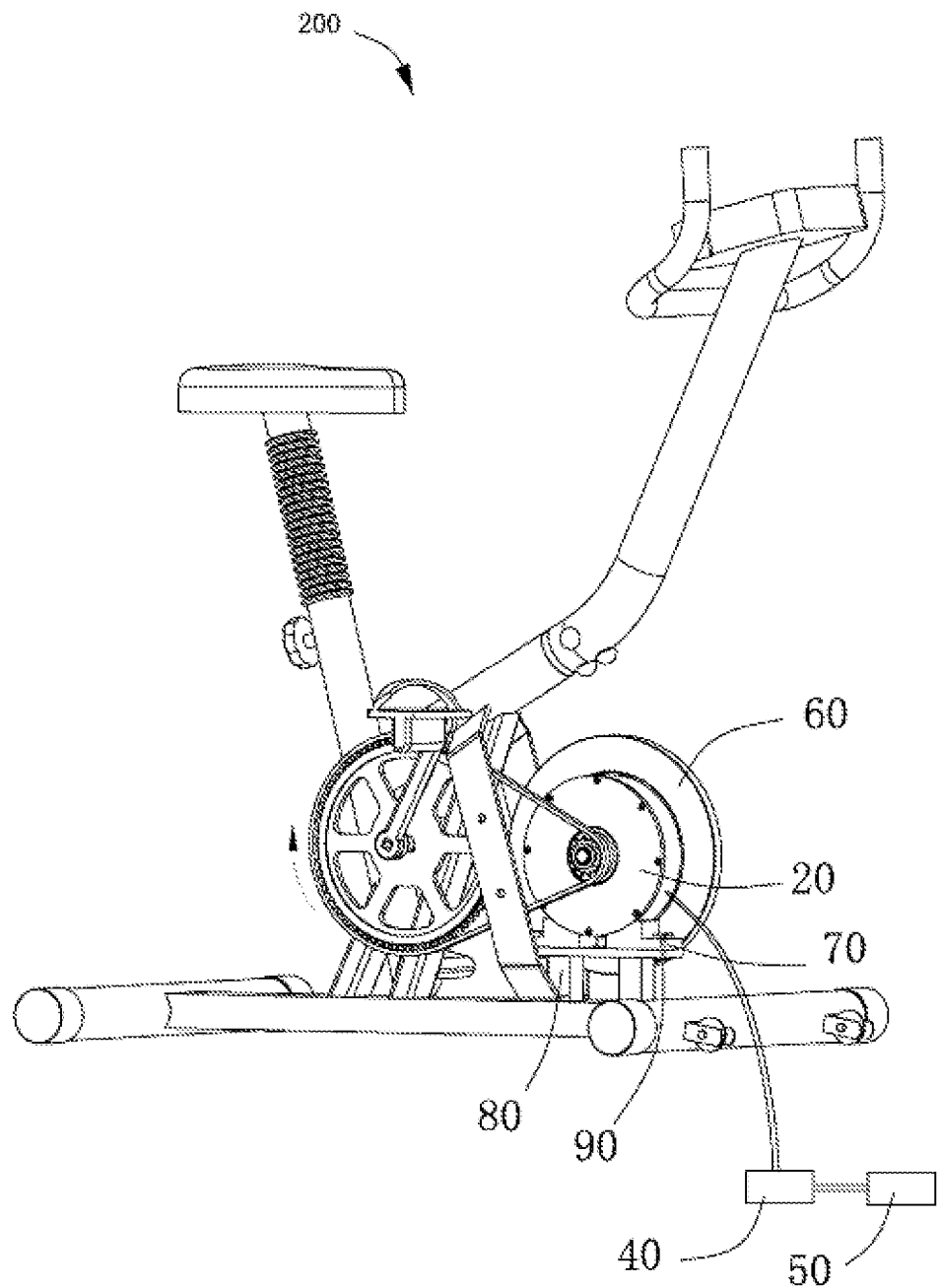
FIG. 6 is a three-dimensionally assembling schematic diagram of a fitness power generation bicycle according to the second embodiment.

Please referring to FIG. 6, the fitness power generation bicycle 200 of the second embodiment is substantially the same as the fitness power generation bicycle 100 of the first embodiment. The difference is that: the fitness power generation bicycle 200 further comprises a flywheel 60, a motor stand 70, two motor bases 80 and four second locking members 90.

Figure 7:
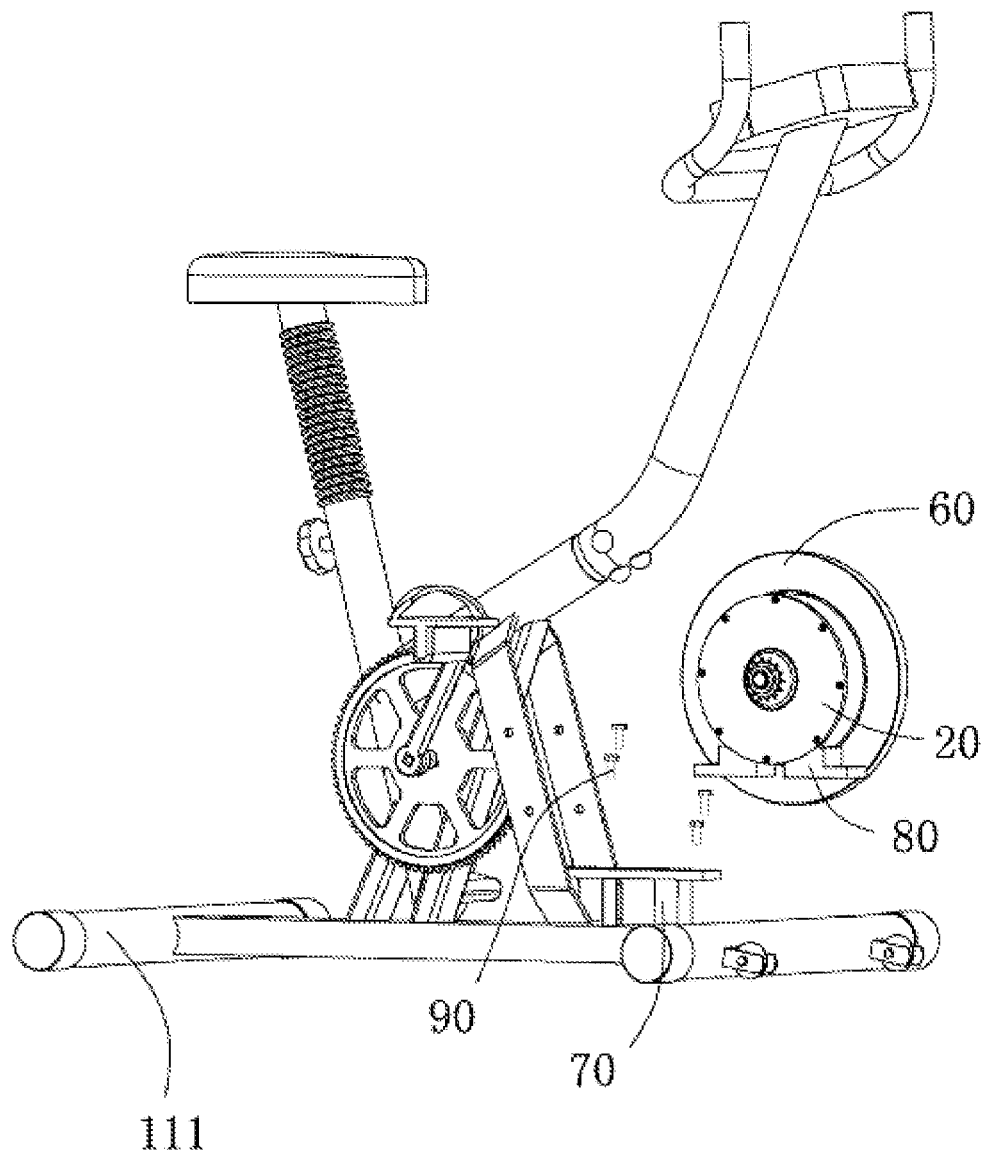
FIG. 7 is a three-dimensionally partially exploded schematic diagram of the fitness power generation bicycle shown in FIG. 6.

Please also referring to FIG. 7, the flywheel 60 is located on the shaft of the generator 20 (which is not shown in drawings) for increasing the inertia of the shaft.

Figure 8:
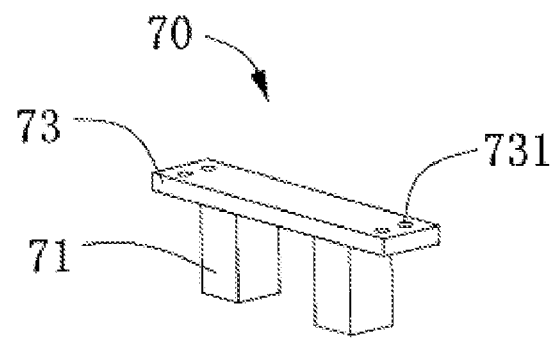
FIG. 8 is three-dimensionally schematic diagram of a motor stand shown in FIG. 6.

Please referring to FIG. 8, the motor stand 70 comprises two supporting legs 71 and a supporting block 73 for connecting the two supporting legs 71 with each other. The two supporting legs 71 can be fixed on the base 111 by welding.

Four through-holes 731 are provided on the supporting block 73 corresponding to four second locking members 90. The generator 20 is movably located on the motor stand 70.

Figure 9:
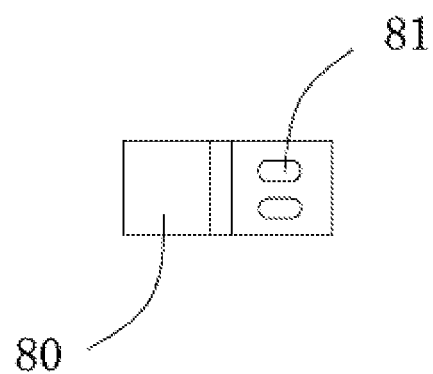
FIG. 9 is a top view of a motor base shown in FIG. 6.

The two motor bases 80 are adapted for supporting the generator 20. Please referring to FIG. 9, a second positioning groove 81, having a long-strip shape, is provided at the position that every motor base 80 is corresponding to the second locking member 90, the extending direction of the second positioning groove is opposite to the drive sprocket.

While assembling, the motor stand 70 is firstly welded on the base 111, and then two motor bases 80 are fixed at the bottom of the generator 20 with the flywheel 60 by bolt, and then every motor base 80 is locked with the motor stand 70 by four second locking members 90. The other assembling processes are similar to those in the first embodiment and not described again here.

It is similar to the first embodiment that, when the user adjusts the fitness strength if necessary, the sliding position of the second locking member 90 in the second positioning groove 81, the distance between the driven sprocket 203 of the generator 20 and the drive sprocket 13 of the bicycle gymnastic device 10 is adjusted, thereby adjusting the degree of tightness of the chain 30.

It can be understood that, the second positioning grooves 81 can also be provided on the motor stand 70, now, the second locking members 90 are correspondingly located on the motor bases 80.

The above-mentioned examples only describe several embodiments of the present invention with more specific and detailed description, and however, they can not be understood as the limit of the scope of the present invention. It should be noted that, for one skilled in the art, they can be made certain variations and modifications without departure from the concept of the present invention, which belongs to the protection scope of the present invention. Therefore, the scope of protection of the present invention should be subject to the claims.

What is claimed is:

1. A fitness power generation bicycle, comprising:
    a bicycle gymnastic device, comprising a main frame and a drive sprocket connected with the main frame;
    a generator located on the main frame, comprising a shaft and a driven sprocket fixed on the shaft;
    a chain connecting the drive sprocket with the driven sprocket;
    a battery electrically connected with the generator for storing an electric energy from the generator; and
    an inverter electrically connected with the battery for adjusting an output current of the battery,
    wherein the main frame comprises a base, a bicycle beam fixedly set on the base, and two support plates located between the base and the bicycle beam, and the generator is movably located on the two support plates,
    wherein the fitness power generation bicycle further comprises two fixing plates respectively fixedly located at two sides of the generator, wherein a first positioning groove is provided at one of the fixing plate and the support plate, and a first locking member, which is capable of sliding within the first positioning groove for adjusting a distance between the driven sprocket and the drive sprocket to adjust a degree of tightness of the chain, is provided on the other of the fixing plate and the support plate.

2. The fitness power generation bicycle, as recited in claim 1, wherein the first positioning groove is provided at an edge of the fixing plate and extends towards a direction away from the drive sprocket.

3. The fitness power generation bicycle, as recited in claim 1, wherein the generator is a rare earth permanent magnet coreless generator.

4. The fitness power generation bicycle, as recited in claim 2, wherein the generator is a rare earth permanent magnet coreless generator.

5. The fitness power generation bicycle, as recited in claim 1, wherein one of the two support plates has a U-shape, and two ends of every support plate respectively fixed on the base and the bicycle beam.

6. The fitness power generation bicycle, as recited in claim 2, wherein one of the two support plates has a U-shape, and two ends of every support plate respectively fixed on the base and the bicycle beam.

7. The fitness power generation bicycle, as recited in claim 3, wherein one of the two support plates has a U-shape, and two ends of every support plate respectively fixed on the base and the bicycle beam.

8. The fitness power generation bicycle, as recited in claim 4, wherein one of the two support plates has a U-shape, and two ends of every support plate respectively fixed on the base and the bicycle beam.

9. The fitness power generation bicycle, as recited in claim 1, further comprising a flywheel located on the shaft of the generator.

10. The fitness power generation bicycle, as recited in claim 1, further comprising a motor stand located on the base, and the generator is movably located on the motor stand.

11. The fitness power generation bicycle, as recited in claim 10, further comprising a motor base fixed with the generator, wherein a second positioning groove is provided at one of the motor base and the motor stand, and a second locking member, which is capable of sliding within the second positioning groove for adjusting a distance between the driven sprocket and the drive sprocket, is provided at the other of the motor base and the motor stand.

12. The fitness power generation bicycle, as recited in claim 9, wherein the generator is a rare earth permanent magnet coreless generator.

13. The fitness power generation bicycle, as recited in claim 10, wherein the generator is a rare earth permanent magnet coreless generator.

14. The fitness power generation bicycle, as recited in claim 11, wherein the generator is a rare earth permanent magnet coreless generator.

* * * * *